(12) United States Patent
Liu et al.

(10) Patent No.: US 10,665,898 B2
(45) Date of Patent: May 26, 2020

(54) ELECTROLYTE LIQUID, METHOD FOR PREPARING THE SAME, AND LITHIUM SULFUR BATTERY USING THE SAME

(71) Applicants: JIANGSU HUADONG INSTITUTE OF LI-ION BATTERY CO., LTD, Suzhou, Jiangsu (CN); TSINGHUA UNIVERSITY, Beijing (CN)

(72) Inventors: Zhen Liu, Beijing (CN); Yu-Ming Shang, Beijing (CN); Xiang-Ming He, Beijing (CN); Li Wang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 12 days.

(21) Appl. No.: 15/763,440

(22) PCT Filed: Sep. 9, 2016

(86) PCT No.: PCT/CN2016/098574
§ 371 (c)(1),
(2) Date: Mar. 26, 2018

(87) PCT Pub. No.: WO2017/050139
PCT Pub. Date: Mar. 30, 2017

(65) Prior Publication Data
US 2018/0269531 A1   Sep. 20, 2018

(30) Foreign Application Priority Data
Sep. 25, 2015   (CN) .......................... 2015 1 0621363

(51) Int. Cl.
| | |
|---|---|
| *H01M 10/0569* | (2010.01) |
| *H01M 10/0567* | (2010.01) |
| *H01M 4/38* | (2006.01) |
| *H01M 10/0525* | (2010.01) |
| *H01M 10/0568* | (2010.01) |
| *H01M 4/02* | (2006.01) |

(52) U.S. Cl.
CPC ......... *H01M 10/0569* (2013.01); *H01M 4/38* (2013.01); *H01M 10/0525* (2013.01); *H01M 10/0567* (2013.01); *H01M 10/0568* (2013.01); *H01M 2004/028* (2013.01); *H01M 2300/0037* (2013.01)

(58) Field of Classification Search
None
See application file for complete search history.

(56) References Cited

U.S. PATENT DOCUMENTS

| | | | |
|---|---|---|---|
| 2012/0164519 A1 | 6/2012 | Lee et al. | |
| 2012/0225359 A1* | 9/2012 | Xu | .......... H01G 9/035 429/338 |
| 2013/0089793 A1* | 4/2013 | Gering | ................ C07F 9/65815 429/336 |
| 2014/0342240 A1* | 11/2014 | Harrup | .............. H01M 10/0567 429/326 |

FOREIGN PATENT DOCUMENTS

| | | |
|---|---|---|
| CN | 101407527 | 4/2009 |
| CN | 102516307 | 6/2012 |
| CN | 102593511 | 7/2012 |
| CN | 102766168 | 11/2012 |
| CN | 103456993 | 12/2013 |
| CN | 103579633 | 2/2014 |
| CN | 104466250 | 3/2015 |

OTHER PUBLICATIONS

International Search Report of PCT/CN2016/098574.

* cited by examiner

*Primary Examiner* — Wojciech Haske (57) ABSTRACT

The present disclosure provides an electrolyte liquid of a lithium sulfur battery comprising a carbonate ester organic solvent, a lithium salt, and a flame-retardant cosolvent, the flame-retardant cosolvent being a phosphazene compound, wherein a mass percentage of the flame-retardant cosolvent is 20% to 50%, a concentration of the lithium salt is 0.8 mol/L to 1.2 mol/L. The present disclosure also provides a lithium sulfur battery and a method for preparing the electrolyte liquid.

16 Claims, 4 Drawing Sheets

ELECTROLYTE LIQUID, METHOD FOR PREPARING THE SAME, AND LITHIUM SULFUR BATTERY USING THE SAME

CROSS-REFERENCE TO RELATED APPLICATIONS

This application claims all benefits accruing under 35 U.S.C. § 119 from China Patent Application No. 201510621363.1, filed on Sep. 25, 2015 in the State Intellectual Property Office of China, the content of which is hereby incorporated by reference. This application is a 35 U.S.C. § 371 national application of international patent application PCT/CN2016/098574 filed on Sep. 9, 2016, the content of which is also hereby incorporated by reference.

FIELD

The invention belongs to the field of electrochemical technology, and particularly relates to electrolytes of lithium sulfur batteries, methods for preparing the same, and lithium sulfur batteries using the same.

BACKGROUND

A lithium sulfur battery is a lithium battery using sulfur element as a cathode electrode and using lithium metal as an anode electrode. According an amount of energy that a complete conversion from unit mass of elemental sulfur to $S^{2-}$ can provide, sulfur has a theoretical discharge capacity per mass of 1675 mAh/g, and a theoretical energy density of about 2600 $Wh \cdot kg^{-1}$, which is much higher than that of a commercialized conventional lithium ion battery (energy density is about 150 $Wh \cdot kg^{-1}$). In addition, sulfur is inexpensive and has no pollution to the environment. The lithium sulfur battery is expected to become a high energy density and long life secondary battery in the future.

However, in practical applications, lithium sulfur batteries still need to solve many problems, such as the electrical conductivity of the cathode electrode material, the volume change during charge and discharge, the lithium dendrite and the shuttle effect of intermediate products, which affect the cycle performance.

Like conventional lithium battery, the lithium sulfur battery has problems such as fire and explosion under a condition of battery abuse. As an important part of the lithium sulfur battery, electrolyte liquid plays an important role in the safety problems. Most of the electrolyte liquids in the lithium sulfur batteries contain ethers, such as 1,2-dimethoxyethane and 1,3-dioxolane, or carbonate esters, such as ethylene carbonate and propylene carbonate, as organic solvents. These solvents have low boiling points, being flammable and explosive. In recent years, developing flame-retardant electrolytes becomes a major measure to solve the safety problems of the lithium sulfur batteries, such as using phosphorus containing flame retardant additives in the electrolyte liquid, or fluorinating the solvents, to solve the flammable problem.

SUMMARY

What is need, therefore, is to provide an electrolyte liquid of a lithium sulfur battery, a method for preparing the same, and the lithium sulfur battery using the same.

An electrolyte liquid of a lithium sulfur battery comprises a carbonate ester organic solvent, a lithium salt, and a flame-retardant cosolvent. The flame-retardant cosolvent is a phosphazene compound having a molecular structure represented by one of formulas (1) to (3). A mass percentage of the flame-retardant cosolvent is 20% to 50%. A concentration of the lithium salt is 0.8 mol/L to 1.2 mol/L, wherein R1 and R2 are hydrocarbon groups and at least one hydrogen atom is replaced by a fluorine atom. The carbon chains of R1 and R2 respectively have 1 to 8 carbon atoms, and R1 and R2 have different carbon chain lengths.

A lithium sulfur battery comprises a cathode electrode, an anode electrode, a separator, and the above-described electrolyte liquid. The cathode electrode and the anode electrode are spaced. The separator is disposed between the cathode electrode and the anode electrode. The electrolyte liquid infiltrates the cathode electrode, the anode electrode, and the separator.

A method for preparing the electrolyte liquid of the lithium sulfur battery comprises following steps:

S1, sodium metal or sodium hydride is reacted in an organic solvent with a first fluorine-containing alcohol and a second fluorine-containing alcohol to form a first fluorine-containing sodium alkoxide solution and a second fluorine-containing sodium alkoxide solution; the first fluorine-containing alcohol and the second fluorine-containing alcohol have different carbon chain lengths with 1 to 8 carbon atoms;

S2, hexachlorocyclotriphosphazene is dissolved in an organic solvent to form a hexachlorocyclotriphosphazene solution; the first fluorine-containing sodium alkoxide solution is firstly and dropwisely added into the hexachlorocyclotriphosphazene solution, and a reaction is carried out for 6 hours to 12 hours at normal temperature after the dropwise addition is completed; the second fluorine-containing sodium alkoxide solution is then dropwisely added, and after the dropwise addition is completed the temperature is raised to 45° C. to 55° C. at which a reaction is carried out for 6 hours to 12 hours to obtain a milky turbid liquid;

S3, the solvent in the milky turbid liquid is evaporated out, and the product obtained after the evaporation is washed with an alkaline water solution;

S4, the product is purified to obtain an orange-yellow transparent liquid; and

S5, the orange-yellow transparent liquid and the carbonate ester organic solvent are mixed to form a mixed solvent, a mass percentage of the carbonate ester organic solvent in the mixed solvent is 20% to 50%; and the lithium salt is added and dissolved in the mixed solvent to form the electrolyte liquid with a lithium salt concentration of 0.8 mol/L to 1.2 mol/L.

Compared with the related art, the present disclosure uses the prepared organic phosphazene compound as the cosolvent in the electrolyte liquid of the lithium sulfur battery which can be reversibly charged and discharged at room temperature. Due to the stable dπ-pπ conjugation of the P—N bonds in the six-membered ring, the organic phosphazene compound has a relatively high chemical stability. The presence of fluorine atoms enhances a binding of the compound with lithium ions, which makes the compound not affect the reversibility of the charge and discharge of the battery. The organic phosphazene compound has a high content of N and P elements, and the modified phosphazene compound contains a plurality of fluorine elements. To use the compound as a solvent component, a strong flame-retardant electrolyte liquid can be obtained. As the cosolvent content in electrolyte liquid increases, the proportion of the carbonate ester organic solvent correspondingly decreases, which can effectively reduce release of the flammable gas without affecting the electrochemical performance, thereby effectively solving the flammable problem of the electrolyte liquid.

DETAILED DESCRIPTION

The lithium sulfur battery electrolyte liquid, the method for preparing the same, and the lithium sulfur battery using the same provided by the present disclosure are further described in detail with reference to the accompanying drawings and specific embodiments.

One embodiment of the present disclosure provides an electrolyte liquid of a lithium sulfur battery. The electrolyte liquid comprises a carbonate ester organic solvent, a flame-retardant cosolvent, and a lithium salt. A mass percentage of the flame-retardant cosolvent is 20% to 50%. A concentration of the lithium salt is 0.8 mol/L to 1.2 mol/L. In one embodiment, the mass percentage of the flame-retardant cosolvent is 40% to 50%.

The flame-retardant cosolvent is a phosphazene compound having a molecular structure represented by one of formulas (1) to (3).

(1)

(2)

(3)

Wherein, R1, R2 are hydrocarbon groups (such as alkyl groups), and at least one H is replaced by F, the carbon chains have 1 to 8 carbon atoms, and R1 and R2 have different carbon chain lengths. In one embodiment, a ratio between fluorine atoms and hydrogen atoms is greater than 3. The carbon chain of R1 and R2 can have a difference of 3 or more in carbon atom number. In one embodiment, a number of carbon atoms of the carbon chain of the R1 can be 5 to 8, and a number of carbon atoms of the carbon chain of the R2 can be 1 to 4.

The molecular structure of the phosphazene compound is composed by two parts: one is the cyclic molecular skeleton structure of phosphazene containing N and P elements; the other is the fluorine-containing side chains. The skeleton structure has a high content of phosphorus and nitrogen, forming a flame-retardant synergistic system with a high flame retardancy. The fluorine-containing side chain is combined with the phosphazene skeleton and can improve compatibility between the phosphazene and the carbonate organic solvent, and can also solve the problem that the chlorine atom in the phosphazene is prone to be oxidized, which provides a synergistic flame-retardant effect. It can be understood that since the phosphazene compound is used as a flame-retardant cosolvent, the higher the content of the phosphazene compound in the electrolyte, the better the flame-retardant effect. However, in the phosphazene compound, as the carbon number increases in the chains, the molecular weight of the side chains increases accordingly, and the viscosity of the phosphazene compound accordingly increases. A high electrolyte viscosity affects the electrochemical performance of the lithium sulfur battery. Therefore, the length of the carbon chain of the phosphazene compound should be as short as possible, and preferably with 1 to 8 carbon atoms. The use of R1 and R2 with different carbon chain lengths of the phosphazene compound can destroy a structural symmetry of the modified side chains and prevent a formation of crystals due to the structural symmetry. In the phosphazene compound, the fluorine element has a flame retardant effect on the one hand, and can act on lithium ions on the other hand, which helps to increase the ionic conduction of the phosphazene compound.

The carbonate ester organic solvent can be selected from cyclic carbonate esters or chain carbonate esters, such as two or three of ethylene carbonate, propylene carbonate, diethyl carbonate, dimethyl carbonate, ethyl methyl carbonate, methyl acetate, ethyl acetate, propyl acetate, methyl propionate, and ethyl propionate.

The lithium salt can be selected from one or more of lithium chloride (LiCl), lithium hexafluorophosphate ($LiPF_6$), lithium tetrafluoroborate ($LiBF_4$), lithium methanesulfonate ($LiCH_3SO_3$), lithium trifluoromethanesulfonate ($LiCF_3SO_3$), lithium hexafluoroarsenate ($LiAsF_6$), lithium perchlorate ($LiClO_4$), lithium bisoxalate borate (LiBOB) and $LiN(CF_3SO_2)_2$.

Figure 1:
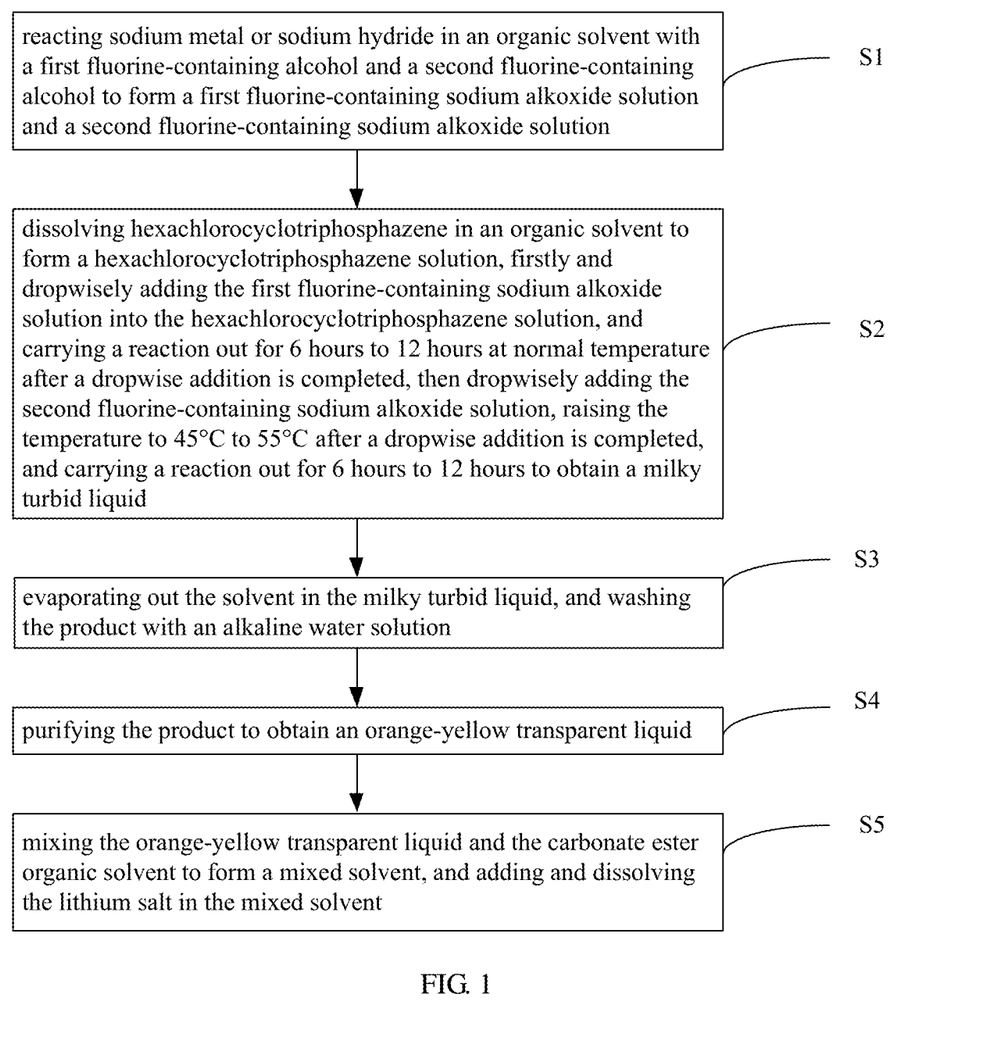
FIG. 1 is a flow chart of one embodiment of a method for preparing an electrolyte liquid of a lithium sulfur battery.

One embodiment of a method for preparing the electrolyte liquid of the lithium sulfur battery comprises following steps:

S1, sodium metal or sodium hydride is respectively reacted in an organic solvent with a first fluorine-containing alcohol and a second fluorine-containing alcohol to form a first fluorine-containing sodium alkoxide solution and a second fluorine-containing sodium alkoxide solution;

S2, hexachlorocyclotriphosphazene is dissolved in an organic solvent to form a hexachlorocyclotriphosphazene solution; the first fluorine-containing sodium alkoxide solution is firstly and dropwisely added into the hexachlorocyclotriphosphazene solution, and a reaction is carried out for 6 hours to 12 hours at normal temperature after the dropwise addition is completed; the second fluorine-containing sodium alkoxide solution is then dropwisely added, and after the dropwise addition is completed the temperature is raised to 45° C. to 55° C. at which a reaction is carried out for 6 hours to 12 hours to obtain a milky turbid liquid;

S3, the solvent in the milky turbid liquid is evaporated out, and the product obtained after the evaporation is washed with an alkaline water solution;

S4, the product is purified to obtain an orange-yellow transparent liquid; and

S5, the orange-yellow transparent liquid and the carbonate ester organic solvent are mixed to form a mixed solvent, a mass percentage of the carbonate ester organic solvent in the mixed solvent is 20% to 50%; and the lithium salt is added and dissolved in the mixed solvent to form the electrolyte liquid with a lithium salt concentration of 0.8 mol/L to 1.2 mol/L.

In step S1, the reaction vessel can be a three-necked flask equipped with a condensing device. Prior to the reaction, an inert gas can be introduced into the reaction vessel to discharge air. The inert gas can be nitrogen or argon. The sodium metal can be pre-shredded into small particles. The organic solvent can be one or more of tetrahydrofuran, dioxane, dichloromethane, and chloroform. The first fluorine-containing alcohol and the second fluorine-containing alcohol have carbon chains with 1 to 8 carbon atoms and have different carbon chain lengths, such as the carbon number difference therebetween can be 3 or more. In one embodiment, the first fluorine-containing alcohol can have a carbon chain with 5 to 8 carbon atoms, and the second fluorine-containing alcohol can have a carbon chain with 1 to 4 carbon atoms. The first fluorine-containing alcohol and the second fluorine-containing alcohol can be respectively selected from but not limited to at least one of octafluoropentanol, hexafluorobutanol, trifluoroethanol, tetrafluoropropanol, hexafluoroisopropanol, and trifluoromethanol. The first fluorine-containing alcohol can be different from the second fluorine-containing alcohol. Specifically, after the inert gas is introduced into the three-necked flask for 30 minutes, the sodium metal or sodium hydride is placed in the three-necked flask, an appropriate amount of organic solvent is added and dispersed by magnetic stirring to form a dispersion. An excess amount of the first fluorine-containing alcohol is weighed, diluted with an organic solvent, placed in a constant pressure funnel, and added dropwisely to the above-described dispersion through the funnel. After the dropwise addition is completed, the reaction is continued for a while until the mixture is transparent, and the first fluorine-containing sodium alkoxide solution is obtained. In the same manner, the second fluorine-containing sodium alkoxide is obtained by reacting the second fluorine-containing alcohol with the sodium metal or the sodium hydride.

In step S2, the hexachlorocyclotriphosphazene can be firstly recrystallized in an organic solvent such as n-heptane for 2 to 3 times, filtered, and vacuum dried at 40° C. to 60° C. for 12 hours to 24 hours. Then the hexachlorocyclotriphosphazene is reacted with the first fluorine-containing sodium alkoxide solution and the second fluorine-containing sodium alkoxide solution. The organic solvent used in step S2 can be one or more of tetrahydrofuran, dioxane, methylene chloride, trichloromethane, n-heptane, acetone, and ethanol, which can be the same with or different from the organic solvent used in step S1. A molar ratio of the first fluorine-containing sodium alkoxide to the hexachlorocyclotriphosphazene is about 1:1 to 3:1. A molar ratio of the second fluorine-containing sodium alkoxide to the hexachlorocyclotriphosphazene is about 3:1 to 5:1.

In step S3, the molecular weight of the product is increased with the reaction of the fluorine-containing sodium alkoxide and the hexachlorocyclotriphosphazene, and the resulting phosphazene compound has a hydrophobicity. The unreacted fluorine-containing alcohol with a longer chain can be removed by being neutralized with a strong base. The alkaline water solution can be ammonia solution or sodium hydroxide.

In step S4, the step of purifying can specifically comprise: S41, extracting the product obtained in step S3, taking the oil layer, diluting and washing the oil with deionized water to neutrality to remove the sodium chloride and the alkaline water solution and obtain an oil-water mixture; S42, extracting, drying, and distillating the solution of step S41 to obtain an orange-yellow transparent liquid. The orange-yellow transparent liquid is the phosphazene compound. The phosphazene compound prepared by the above method has a high yield of 70% to 80%.

One embodiment of a lithium sulfur battery comprises a cathode electrode, an anode electrode, a separator, and the above-described electrolyte liquid of the lithium sulfur battery. The cathode electrode and the anode electrode are spaced from each other, and the separator is disposed between the cathode electrode and the anode electrode. The electrolyte liquid infiltrates the cathode electrode, the anode electrode, and the separator.

The cathode electrode can include a cathode electrode current collector and a cathode electrode material layer. The cathode electrode current collector can have a shape of a foil or a mesh, supporting the cathode electrode material layer and conducting electrical current. A material of the cathode electrode current collector can be selected from aluminum, titanium, or stainless steel. The cathode electrode material layer is disposed on at least one surface of the cathode electrode current collector. The cathode electrode material layer can comprise a sulfur containing cathode active material, a conducting agent, and a binder. The sulfur containing cathode active material can be at least one of elemental sulfur and a sulfur-based conductive polymer. The sulfur-based conductive polymer can be a product obtained by mixing a conductive polymer with elemental sulfur and performing a pyrolysis reaction, a dehydrocarbonization reaction, a dehydration reaction, a dehydrochlorination reaction, or a deamine reaction. The sulfur-based conductive polymer can include, but is not limited to, one or more of sulfurized polyacrylonitrile, sulfurized poly(pyridine), sulfurized polystyrene, sulfurized polyethylene oxide, sulfurized polyvinyl alcohol, sulfurized polyvinylidene chloride, sulfurized polyvinylidene fluoride, sulfurized polyvinyl chloride, sulfurized polyvinyl fluoride, sulfurized polyvinylidene chloride, sulfurized polyvinylidene fluoride, sulfurized polymethyl methacrylate, and sulfurized phenolic resin. The conducting agent can be a carbon material such as one or more of carbon black, conductive polymer, acetylene black, carbon fiber, carbon nanotubes, and graphite. The binder can be one or more of polyvinylidene fluoride (PVDF), poly(vinylidene fluoride), polytetrafluoroethylene (PTFE), fluorine rubber, ethylene propylene diene rubber, and styrene butadiene rubber (SBR). The anode electrode can be lithium metal.

The separator is a porous film, and the material can be a polyolefin-based material such as polypropylene (PP), polyethylene (PE), or an inorganic material such as a porous ceramic.

In addition, the lithium ion battery can further include a housing in which the cathode electrode, the anode electrode, the separator, and the electrolyte liquid are accommodated.

Example 1

(1) After introducing nitrogen gas into a three-necked flask equipped with a condensing device for 30 minutes, an amount of sodium metal particles are weighed and put into the three-necked flask, an appropriate amount of tetrahydrofuran is added, and magnetically stirring and dispersing are performed to form a dispersion. An excess amount of octafluoropentanol relative to the sodium metal is weighed and diluted with an amount of tetrahydrofuran. Then the solution is place in a constant pressure funnel and slowly added to the dispersion. After the addition is complete, the reaction is continued for a while until the mixture is clear, thereby forming the first fluorine-containing sodium alkoxide.

Another three-necked flask equipped with a condensing device is taken. After introducing nitrogen gas into the three-necked flask for 30 minutes, an amount of sodium metal particles are weighed and put into the three-necked flask, an appropriate amount of tetrahydrofuran is added, and magnetically stirring and dispersing are performed to form a dispersion. An excess amount of trifluoromethanol relative to the sodium metal is weighed and diluted with an amount of tetrahydrofuran. Then the solution is place in a constant pressure funnel and slowly added to the dispersion. After the addition is complete, the reaction is continued for a while until the mixture is clear, thereby forming the second fluorine-containing sodium alkoxide.

(2) Hexachlorocyclotriphosphazene is recrystallized in a solvent for 2 to 3 times, filtered, and vacuum-dried at a temperature of 60° C. for 24 hours. Then the hexachlorocyclotriphosphazene is placed in a three-necked flask, and tetrahydrofuran is added, and the mixture is stirred till the hexachlorocyclotriphosphazene is completely dissolved. The above-obtained first fluorine-containing sodium alkoxide is slowly added dropwisely, and the molar ratio of the first fluorine-containing sodium alkoxide to the hexachlorocyclotriphosphazene is about 3:1. After the dropwise addition is completed, the reaction is continued for 6 to 12 hours.

Then, the second fluorine-containing sodium alkoxide is slowly added dropwisely, and the second fluorine-containing sodium alkoxide and the first fluorine-containing sodium alkoxide have the same molar ratio. After the dropwise addition is completed, the temperature is raised to 45° C. to 55° C., and the reaction is continued for 6 to 12 hours, then the reaction is stopped, resulting in a milky turbid liquid.

(3) The solvent in the milky turbid liquid is evaporated out and the dried product is washed with an alkaline water solution.

(4) The solution of step (3) is separated, the lower layer of oil is taken, and after dilution, the oil is washed with deionized water to neutrality.

(5) The solution of step (4) is extracted, dried, and vacuum distilled to obtain an orange-yellow transparent liquid, which is the phosphazene compound. The synthesized fluorine-containing phosphazene compound can have the structure:

and a yield is 74%.

(6) The phosphazene compound is used as a flame-retardant cosolvent. The carbonate ester organic solvent and the phosphazene compound are evenly mixed in a glove box. The mass percentage of the phosphazene compound is 20% in the formed mixed solvent. $LiPF_6$ is added to the mixed solvent, stirred, and dissolved to prepare an electrolyte liquid having a concentration of 1 mol/L.

Example 2

Example 2 is the same as Example 1, except that in step (6), the mass percentage of the phosphazene compound is 30% in the formed mixed solvent. $LiPF_6$ is added to the mixed solvent, stirred, and dissolved to prepare an electrolyte liquid having a concentration of 1 mol/L.

Example 3

Example 3 is the same as Example 1, except that in step (6), the mass percentage of the phosphazene compound is 40% in the formed mixed solvent. $LiPF_6$ is added to the mixed solvent, stirred, and dissolved to prepare an electrolyte liquid having a concentration of 1 mol/L.

Example 4

(1) After introducing nitrogen gas into a three-necked flask equipped with a condensing device for 30 minutes, an amount of sodium hydride is weighed and put into the three-necked flask, an appropriate amount of tetrahydrofuran is added, and magnetically stirring and dispersing are performed to form a dispersion. An excess amount of octafluoropentanol relative to the sodium hydride is weighed and diluted with an amount of tetrahydrofuran. Then the solution is place in a constant pressure funnel and slowly added to the dispersion. After the addition is complete, the reaction is continued for a while until the mixture is clear, thereby forming the first fluorine-containing sodium alkoxide.

Another three-necked flask equipped with a condensing device is taken. After introducing nitrogen gas into the three-necked flask for 30 minutes, an amount of sodium hydride is weighed and put into the three-necked flask, an appropriate amount of tetrahydrofuran is added, and magnetically stirring and dispersing are performed to form a dispersion. An excess amount of trifluoromethanol relative to the sodium hydride is weighed and diluted with an amount of tetrahydrofuran. Then the solution is place in a constant pressure funnel and slowly added to the dispersion. After the addition is complete, the reaction is continued for a while until the mixture is clear, thereby forming the second fluorine-containing sodium alkoxide.

(2) Hexachlorocyclotriphosphazene is recrystallized in a solvent for 2 to 3 times, filtered, and vacuum-dried at a temperature of 60° C. for 24 hours. Then the hexachlorocyclotriphosphazene is placed in a three-necked flask, and tetrahydrofuran is added, and the mixture is stirred till the hexachlorocyclotriphosphazene is completely dissolved. The above-obtained first fluorine-containing sodium alkoxide is slowly added dropwisely, and the molar ratio of the first fluorine-containing sodium alkoxide to the hexachlorocyclotriphosphazene is about 2:1. After the dropwise addition is completed, the reaction is continued for 6 to 12 hours. Then, the second fluorine-containing sodium alkoxide is slowly added dropwisely, and a molar ration of the second fluorine-containing sodium alkoxide to the hexachlorocyclotriphosphazene is about 4:1. After the dropwise addition is completed, the temperature is raised to 45° C. to 55° C., and the reaction is continued for 6 to 12 hours, then the reaction is stopped, resulting in a milky turbid liquid.

(3) The solvent in the milky turbid liquid is evaporated out and the dried product is washed with an alkaline water solution.

(4) The solution of step (3) is separated, the lower layer of oil is taken, and after dilution, the oil is washed with deionized water to neutrality.

(5) The solution of step (4) is extracted, dried, and vacuum distilled to obtain an orange-yellow transparent liquid, which is the phosphazene compound. The synthesized fluorine-containing phosphazene compound can have the structure:

(6) The phosphazene compound is used as a flame-retardant cosolvent. The carbonate ester organic solvent and the phosphazene compound are evenly mixed in a glove box. The mass percentage of the phosphazene compound is 30% in the formed mixed solvent. $LiPF_6$ is added to the mixed solvent, stirred, and dissolved to prepare an electrolyte liquid having a concentration of 1 mol/L.

Examples 5-7

Lithium sulfur batteries are assembled using the electrolyte liquids of Examples 1 to 3, respectively. The cathode active material is sulfurized polyacrylonitrile, the binder is polytetrafluoroethylene, the conducting agent is acetylene black, and the dispersant is ethanol. The mass ratio between the sulfurized polyacrylonitrile, the binder, the conducting agent, and the dispersant is 80:10:5:5. The sulfurized polyacrylonitrile, the binder, the conducting agent, and the dispersant are mixed to form a slurry, and the slurry is coated on nickel, and the dispersant is dried out. Lithium metal is used as the anode electrode, and a celgard 2400 film is used as the separator. The open circuit voltage of the assembled lithium sulfur batteries is about 2.6 V to 2.8V.

Comparative Example 1

A lithium sulfur batteries is assembled by having an electrolyte liquid without the flame-retardant cosolvent. The cathode active material is sulfurized polyacrylonitrile, the binder is polytetrafluoroethylene, the conducting agent is acetylene black, and the dispersant is ethanol. The mass ratio between the sulfurized polyacrylonitrile, the binder, the conducting agent, and the dispersant is 80:10:5:5. The sulfurized polyacrylonitrile, the binder, the conducting agent, and the dispersant are mixed to form a slurry, and the slurry is coated on nickel, and the dispersant is dried out. Lithium metal is used as the anode electrode, and a celgard 2400 film is used as the separator. The electrolyte includes only the same carbonate ester organic solvent and $LiPF_6$ as in Example 1, and the $LiPF_6$ also has a concentration of 1 mol/L. The open-circuit voltage of the lithium sulfur battery is about 2.6 V to 2.8V.

Figure 2:
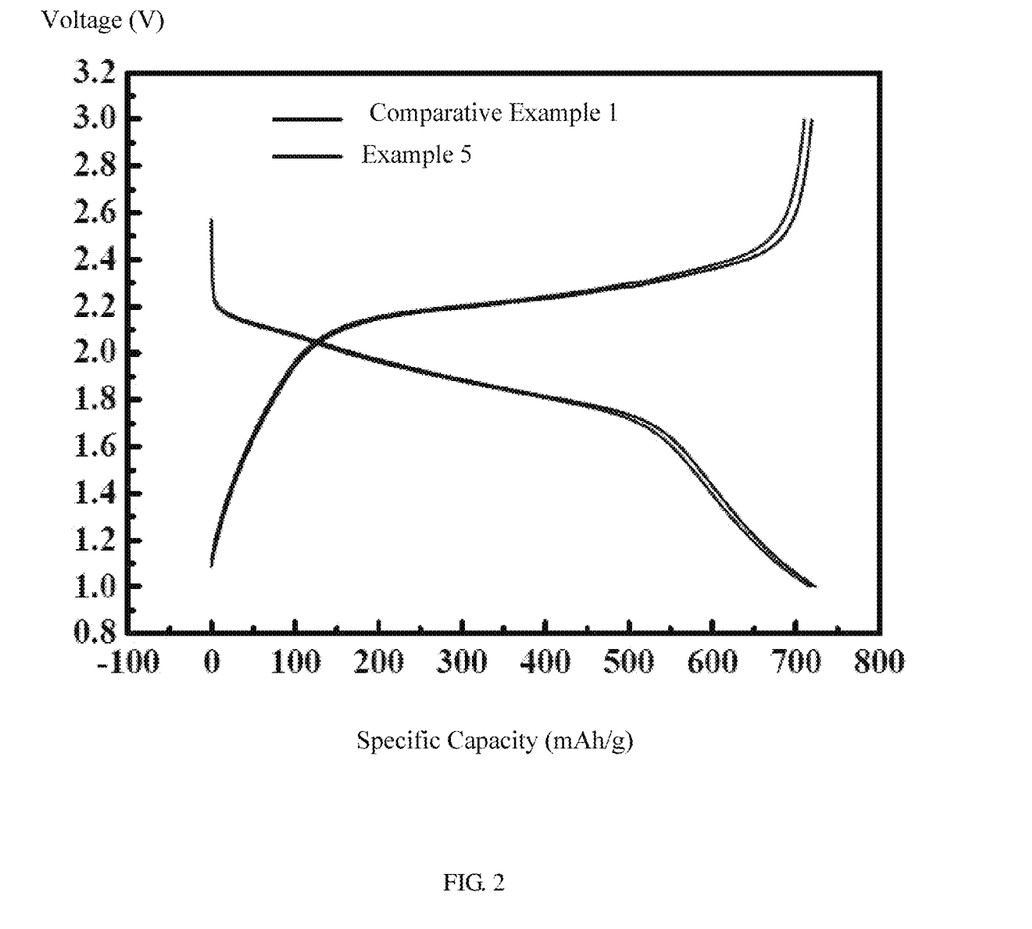
FIG. 2 shows charge and discharge curves of one embodiment of the electrolyte liquid in a half-cell.
Figure 3:
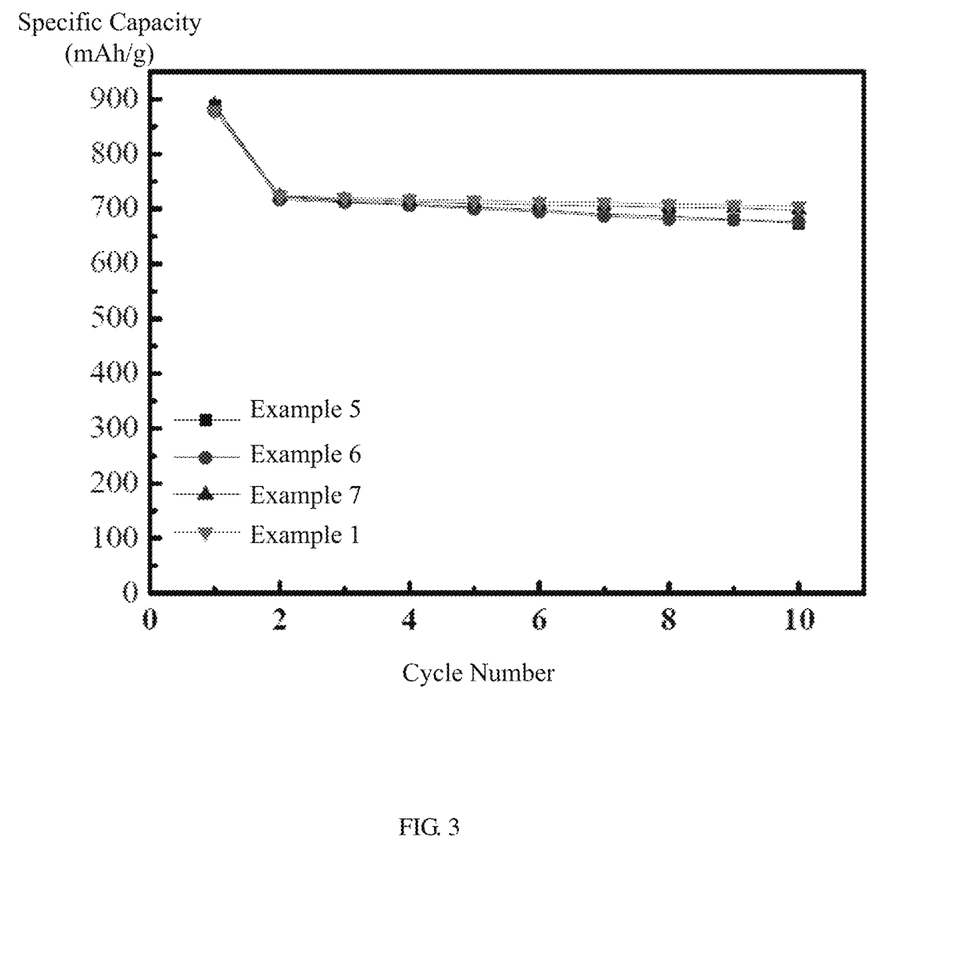
FIG. 3 shows cycle performance curves of embodiments of the electrolyte liquids in the half-cell.

Referring to FIG. 2, the lithium sulfur batteries of Example 5 and Comparative Example 1 are charged and discharged at a constant current between 1 V and 2.6 V. The voltage-capacity curve of Example 5 is a typical charge-discharge curve of a lithium sulfur battery, basically the same with the charge-discharge curve of Comparative Example 1, and no side reactions occur. Referring to FIG. 3, the lithium sulfur batteries of Examples 5 to 7 and Comparative Example 1 are charged and discharged in the voltage range from 1 V to 2.6 V. The reversible discharge specific capacities of Examples 5 to 7 are 710 mAh/g to 725 mAh/g, and the capacity after 10 cycles is still higher than 680 mAh/g, which is comparable to that of Comparative Example 1.

Figure 4:
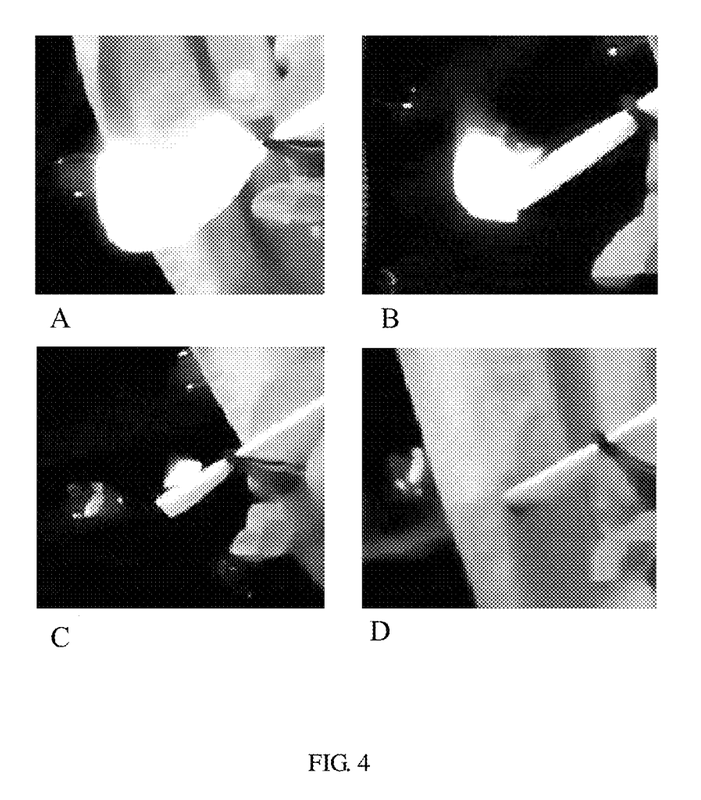
FIG. 4 shows a flame-retardant performance test of one embodiment of the electrolyte liquid, A: the electrolyte liquid does not contain a flame-retardant cosolvent; B: the mass percentage of the flame-retardant cosolvent is 15%; C: the mass percentage of the flame-retardant cosolvent is 33%; (d): the mass percentage of the flame-retardant cosolvent is 50%.

Referring to FIG. 4, the electrolyte liquid is ignited, and it can be seen that the flame retardancy increases with the content of the flame-retardant cosolvent in the electrolyte liquid. When the flame-retardant cosolvent content in the electrolyte liquid is 50%, the electrolyte liquid does not ignite.

In the present disclosure, the prepared organic phosphazene compound is used as the cosolvent in the electrolyte liquid of the lithium sulfur battery which can be reversibly charged and discharged at room temperature. Due to the stable dπ-pπ conjugation of the P—N bonds in the six-membered ring, the organic phosphazene compound has a relatively high chemical stability. The presence of fluorine atoms enhances a binding of the compound with lithium ions, which makes the compound not affect the reversibility of the charge and discharge of the battery. The organic phosphazene compound has a high content of N and P elements, and the modified phosphazene compound contains a plurality of fluorine elements. To use the compound as a solvent component, a strong flame-retardant electrolyte liquid can be obtained. As the cosolvent content in electrolyte liquid increases, the proportion of the carbonate ester organic solvent correspondingly decreases, which can effectively reduce release of the flammable gas without affecting the electrochemical performance, thereby effectively solving the flammable problem of the electrolyte liquid.

In addition, those skilled in the art can also make other changes within the spirit of the present disclosure. Of course, these changes made in accordance with the spirit of the present invention should be included in the scope of the claimed invention.

What is claimed is:

1. An electrolyte liquid of a lithium sulfur battery comprising a carbonate ester organic solvent, a lithium salt, and a flame-retardant cosolvent, the flame-retardant cosolvent being a phosphazene compound having a molecular structure represented by one of formulas (1) to (3), wherein $R_1$ and $R_2$ are hydrocarbon groups, and only a hydrogen atom is replaced by a fluorine atom, $R_1$ and $R_2$ have different carbon chain lengths, and carbon chains of $R_1$ and $R_2$ have a difference of 3 or more in carbon atom number, 2. The electrolyte liquid of claim 1, wherein a mass percentage of the flame-retardant cosolvent is 20% to 50%.

3. The electrolyte liquid of claim 1, wherein a concentration of the lithium salt is 0.8 mol/L to 1.2 mol/L.

4. The electrolyte liquid of claim 1, wherein $R_1$ and $R_2$ respectively have 1 to 8 carbon atoms.

5. The electrolyte liquid of claim 1, wherein in the phosphazene compound, a ratio between fluorine atoms and hydrogen atoms is greater than 3.

6. The electrolyte liquid of claim 1, wherein the carbonate ester organic solvent is two or three selected from the group consisting of ethylene carbonate, propylene carbonate, diethyl carbonate, dimethyl carbonate, ethyl methyl carbonate, methyl acetate, ethyl acetate, propyl acetate, methyl propionate, and ethyl propionate.

7. The electrolyte liquid of claim 1, wherein the lithium salt is selected from the group consisting of LiCl, $LiPF_6$, $LiBF_4$, $LiCH_3SO_3$, $LiCF_3SO_3$, $LiAsF_6$, $LiClO_4$, LiBOB, $LiN(CF_3SO_2)_2$ and combinations thereof.

8. The electrolyte liquid of claim 1, wherein a number of carbon atoms of the carbon chain of the $R_1$ is 5 to 8, and a number of carbon atoms of the carbon chain of R2 is 1 to 4.

9. A lithium sulfur battery comprising a cathode electrode, an anode electrode, a separator, and an electrolyte liquid, wherein the cathode electrode and the anode electrode are spaced, the separator is disposed between the cathode electrode and the anode electrode, and the electrolyte liquid infiltrates the cathode electrode, the anode electrode, and the separator;

the electrolyte liquid comprises a carbonate ester organic solvent, a lithium salt, and a flame-retardant cosolvent, the flame-retardant cosolvent is a phosphazene compound having a molecular structure represented by one of formulas (1) to (3), wherein $R_1$ and $R_2$ are hydrocarbon groups, and only a hydrogen atom is replaced by a fluorine atom, $R_1$ and $R_2$ have different carbon chain lengths, and carbon chains of $R_1$ and $R_2$ have a difference of 3 or more in carbon atom number, 10. The lithium sulfur battery of claim 9, wherein the cathode electrode comprises sulfur.

11. The method of claim 9, wherein a number of carbon atoms of the carbon chain of $R_1$ is 5 to 8, and a number of carbon atoms of the carbon chain of R2 is 1 to 4.

12. A method for preparing an electrolyte liquid of a lithium sulfur battery comprising following steps:

S1, respectively reacting sodium metal or sodium hydride in a first organic solvent with a first fluorine-containing alcohol and a second fluorine-containing alcohol to form a first fluorine-containing sodium alkoxide solution and a second fluorine-containing sodium alkoxide solution, the first fluorine-containing alcohol and the second fluorine-containing alcohol having different carbon chain lengths, and carbon chains of the first fluorine-containing alcohol and the second fluorine-containing alcohol have a difference of 3 or more in carbon atom number;

S2, dissolving hexachlorocyclotriphosphazene in a second organic solvent to form a hexachlorocyclotriphosphazene solution; adding the first fluorine-containing sodium alkoxide solution into the hexachlorocyclotriphosphazene solution to have a first reaction; then adding the second fluorine-containing sodium alkoxide solution, raising the temperature to 45° C. to 55° C., and carrying a second reaction to obtain a milky turbid liquid;

S3, drying the milky turbid liquid, and washing a dried product thereof with an alkaline water solution;

S4, purifying the dried product to obtain an orange-yellow transparent liquid; and S5, mixing the orange-yellow transparent liquid and a carbonate ester organic solvent to form a mixed solvent, and adding a lithium salt into the mixed solvent;

the electrolyte liquid comprising the carbonate ester organic solvent, the lithium salt, and a flame-retardant cosolvent, the flame-retardant cosolvent being a phosphazene compound having a molecular structure represented by one of formulas (1) to (3), wherein $R_1$ and $R_2$ are hydrocarbon groups, and only a hydrogen atom is replaced by a fluorine atom, $R_1$ and $R_2$ have different carbon chain lengths, and carbon chains of $R_1$ and $R_2$ have a difference of 3 or more in carbon atom number, 13. The method of claim 12, wherein the first fluorine-containing alcohol and the second fluorine-containing alcohol respectively have 1 to 8 carbon atoms.

14. The method of claim 12, wherein the first and second organic solvents are respectively selected from the group consisting of tetrahydrofuran, dioxane, dichloromethane, chloroform, and a combination thereof.

15. The method of claim 12, wherein a molar ratio of the first fluorine-containing sodium alkoxide to the hexachlorocyclotriphosphazene is 1:1 to 3:1, and a molar ratio of the second fluorine-containing sodium alkoxide to the hexachlorocyclotriphosphazene is 3:1 to 5:1.

16. The method of claim 12, wherein a number of carbon atoms of the carbon chain of the first fluorine-containing alcohol is 5 to 8, and a number of carbon atoms of the carbon chain of the second fluorine-containing alcohol is 1 to 4.

* * * * *